(12) United States Patent
Ishikawa

(10) Patent No.: US 9,152,605 B2
(45) Date of Patent: Oct. 6, 2015

(54) APPARATUS, METHOD, AND COMPUTER-READABLE STORAGE MEDIUM FOR DATA PROCESSING IN A RING BUS

(75) Inventor: Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 12/794,645

(22) Filed: Jun. 4, 2010

(65) Prior Publication Data

US 2010/0313001 A1    Dec. 9, 2010

(30) Foreign Application Priority Data

Jun. 8, 2009   (JP) .................................. 2009-137343

(51) Int. Cl.
  *G06F 15/76*   (2006.01)
  *G06F 15/173*  (2006.01)
  *H04L 12/40*   (2006.01)
  *H04L 12/42*   (2006.01)

(52) U.S. Cl.
  CPC .......... *G06F 15/76* (2013.01); *G06F 15/17375* (2013.01); *H04L 12/40006* (2013.01); *H04L 12/42* (2013.01)

(58) Field of Classification Search
  CPC .............. G06F 15/76; G06F 15/17375; G06F 12/40006; G06F 12/42
  USPC ......................................................... 712/29
  See application file for complete search history.

(56) References Cited

U.S. PATENT DOCUMENTS 5,630,151 A * 5/1997 Muramatsu et al. .......... 712/201
5,666,484 A   9/1997 Orimo
7,830,872 B2 * 11/2010 Yokoyama et al. ........... 370/389

FOREIGN PATENT DOCUMENTS

| JP | 61-088340 A  | 5/1986  |
| JP | 01-023340 A  | 1/1989  |
| JP | 2518293 B2   | 7/1996  |
| JP | 2834210 B2   | 12/1998 |
| JP | 2001-092772 A | 4/2001 |
| JP | 2003-158533 A | 5/2003 |
| JP | 2003-304245 A | 10/2003 |

* cited by examiner

*Primary Examiner* — Benjamin Geib
(74) *Attorney, Agent, or Firm* — Canon U.S.A., Inc. IP Division

(57) ABSTRACT

An apparatus includes a plurality of processing modules which are connected to each other by corresponding communication unit and the modules transfer packets in a predetermined direction to execute a plurality of operations of pipeline processing. The module includes a storage unit for storing a first identification and a second identification for each of the plurality of operations, a reception unit for extracting data from a packet which has the first identification, a processing unit for processing the data extracted by the reception unit, and a transmission unit for storing the second identification corresponding to the first identification of the packet a packet and transmitting the packet to the module arranged in the predetermined direction.

19 Claims, 13 Drawing Sheets

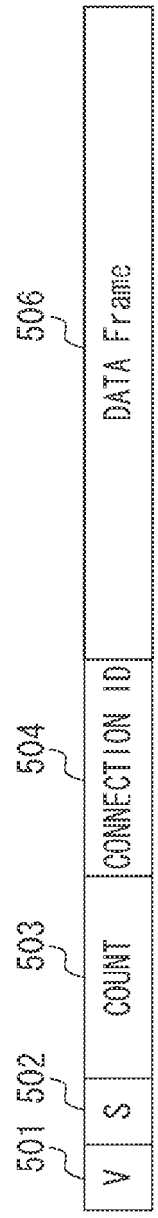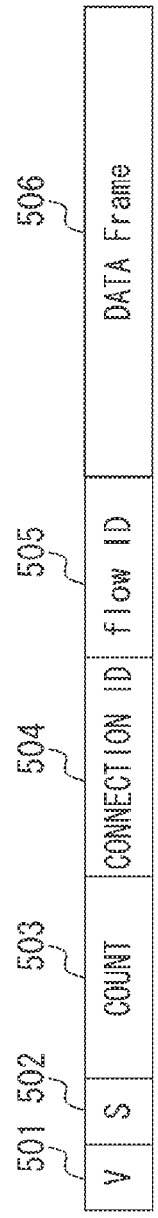

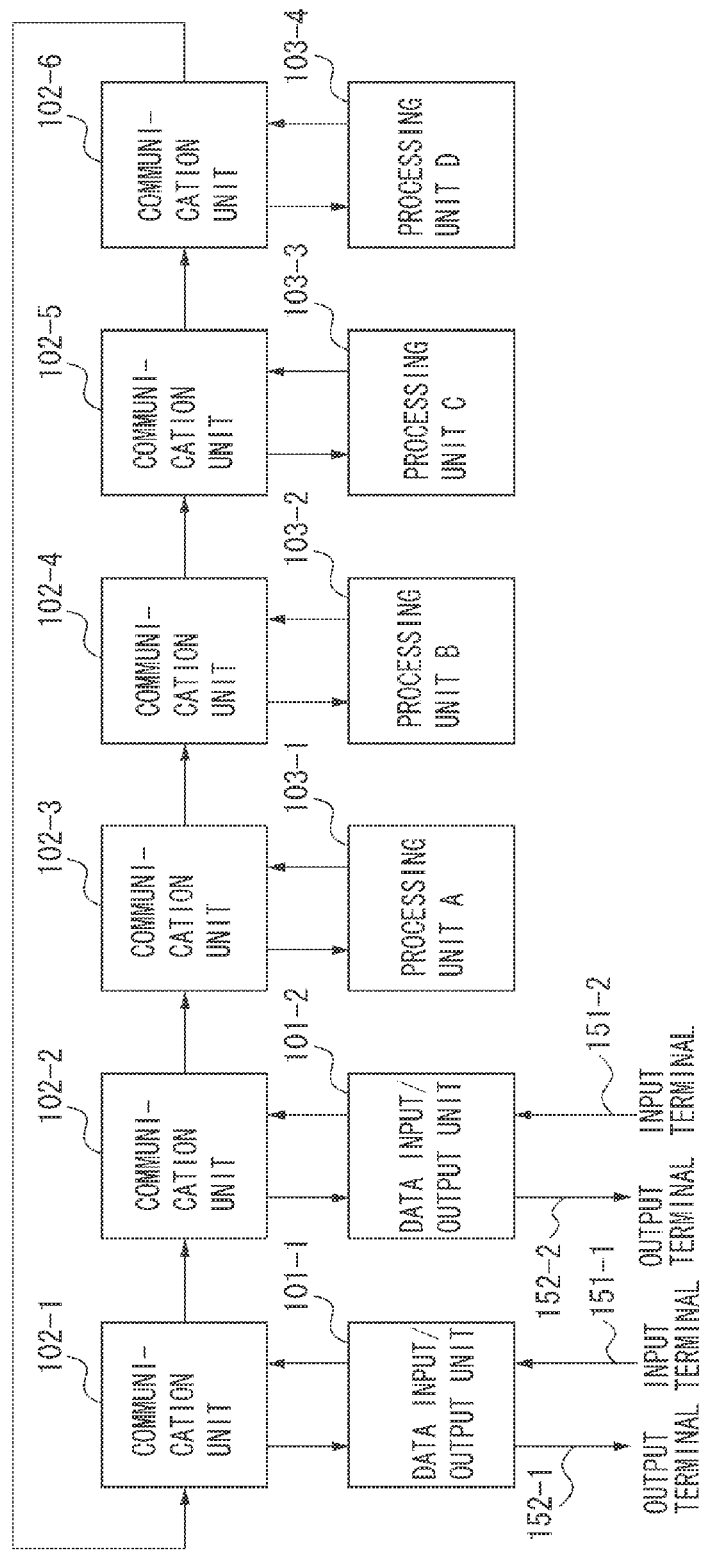

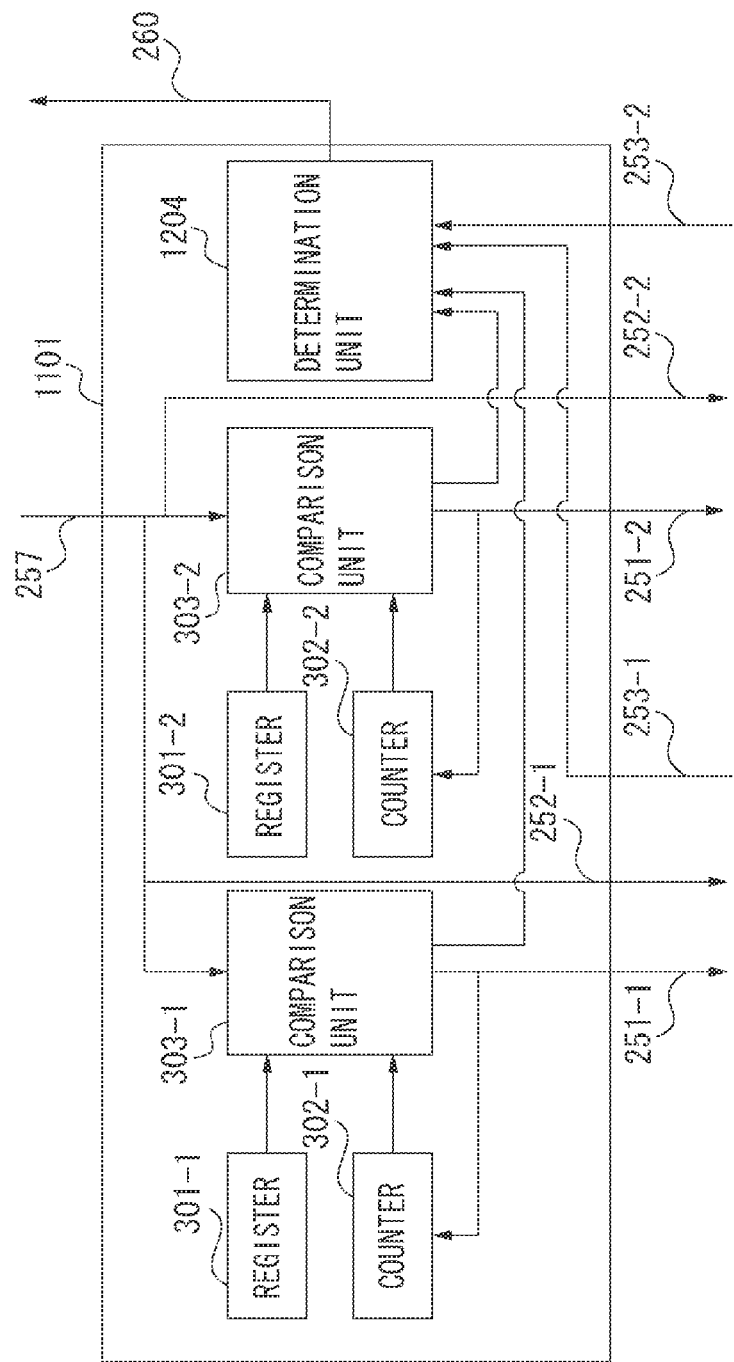

APPARATUS, METHOD, AND COMPUTER-READABLE STORAGE MEDIUM FOR DATA PROCESSING IN A RING BUS

BACKGROUND OF THE INVENTION

1. Field of the Invention

The present invention relates to a data processing technique for realizing suitable parallel processing by controlling data flow in a plurality of data processing modules connected to a plurality of ring buses.

2. Description of the Related Art

Conventionally, to execute a series of data processing efficiently at high speed, the series of data processing is divided, and allocated to hardware modules. In this way, by connecting the hardware modules with each other in the order of the processing, pipeline processing is executed at high speed.

Further, in some cases of image processing, by changing the order of the processing executed by hardware modules, the processing can be executed efficiently. For example, when a processed image is output to an output apparatus configured to handle a predetermined pixel number, resolution conversion for adjusting the pixel number (or resolution) needs to be executed somewhere in a series of processing. In this case, when the pixel number of the input image is greater than the pixel number that can be handled by the output apparatus, the resolution conversion is executed in upstream-side processing, since it is preferable that the image is processed after the pixel number is reduced. On the other hand, when the pixel number of the input image is less than the pixel number that can be handled by the output apparatus, it is preferable that the image is processed while maintaining the small number of pixels without executing the resolution conversion and the resolution conversion is executed on the image immediately before output, namely, in downstream-side processing.

It is assumed data is converted from one space (e.g. a space of an input device) into a standard space (e.g. resolution 600 pixel per inch (ppi), and CIELAB color space) to be processed and the processed data is further converted from the standard space into another space (e.g. a space of an output device). In this case, the order of the processing executed by space conversion units on input and output sides (the order of the processing concerning a one-dimensional look-up table (LUT), matrix calculation, three-dimensional LUT, and the like) is reversed. In other words, if the order of the processing can be changed, the same processing module can be shared on the input and output sides.

However, based on the above conventional method of connecting hardware modules with each other in the order of the processing, the order of the processing executed by the modules cannot be changed. Thus, to accommodate the above case, additional modules (namely, a plurality of modules having the same function) need to be mounted.

According to a method discussed in Japanese Patent Application Laid-Open No. 01-023340, by changing a data connection destination in a ring network, the order of the processing executed by the modules can be changed, and therefore, the above additional modules can be eliminated. Further, contents of the processing executed by each processing module can be changed, as discussed in Japanese Patent No. 2518293.

Japanese Patent No. 2834210 discusses a data flow control method for improving extendability and maintainability by using broadcast communication.

However, according to the conventional methods, it is difficult to control complex data flows, such as data flow branches (reference to identical data by a plurality of modules), simultaneous execution of a plurality of data flows, and time-division multiplexing by processing modules. Data flow branches (reference to identical data by a plurality of modules) can be realized by using broadcast communication as discussed in Japanese Patent No. 2834210. However, data flow control for realizing data flow integration, simultaneous execution of a plurality of data flows, time-division multiplexing by processing modules, and the like is complex, and the transfer efficiency may be decreased.

SUMMARY OF THE INVENTION

According to an aspect of the present invention, an apparatus includes a plurality of modules which are connected to each other by corresponding communication unit, and the modules transfer packets in a predetermined direction to execute a plurality of operations of pipeline processing. The module includes a storage unit configured to store a first identification and a second identification for each of the plurality of operations, a reception unit configured to extract data from a packet which has the first identifications, a processing unit configured to process the extracted data extracted, and a transmission unit configured to store the second identification corresponding to the first identification in a packet and to transmit the packet to the module.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate formats of packets flowing on a ring bus in the case of a single data flow and a plurality of data flows, respectively.

FIG. 5 is a block diagram illustrating an example of the data processing unit including four processing units.

FIGS. 11A and 11B are block diagrams illustrating schematic configurations of the data reception unit and the data transmission unit, respectively.

DESCRIPTION OF THE EMBODIMENTS

Various exemplary embodiments, features, and aspects of the invention will be described in detail below with reference to the drawings.

Figure 1:
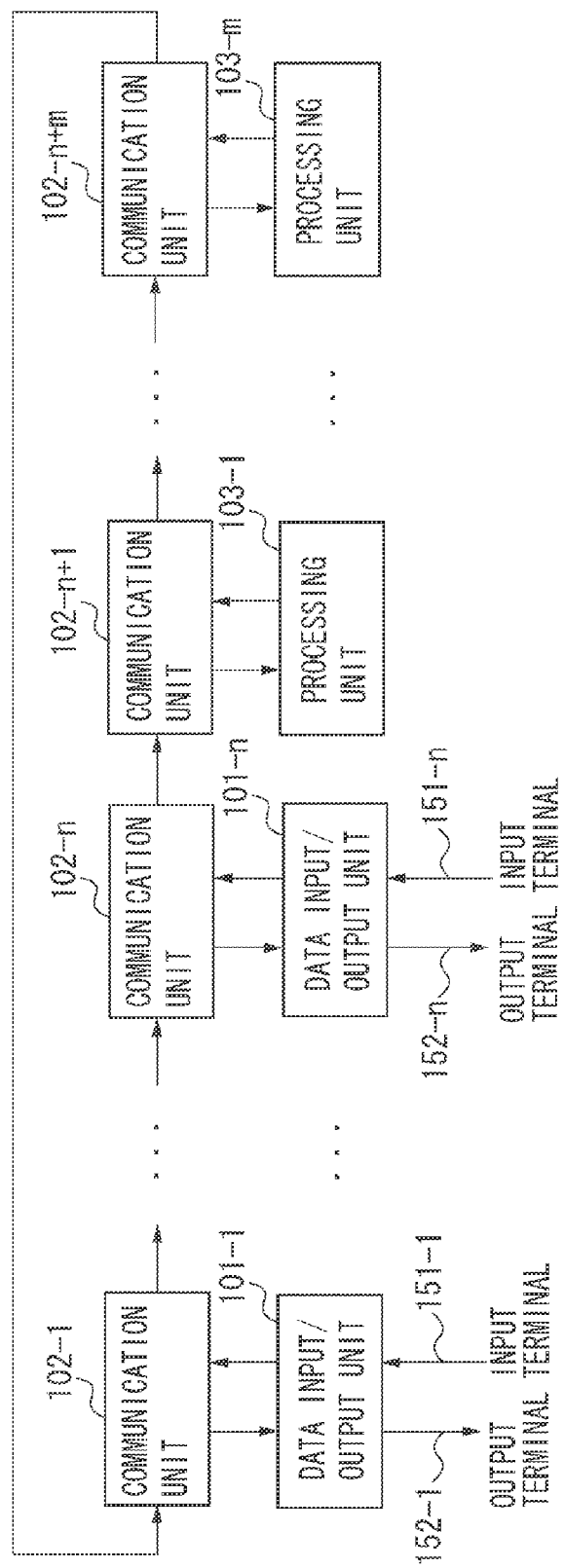
FIG. 1 is a block diagram illustrating a schematic configuration of a data processing unit.

FIG. 1 is a block diagram illustrating a schematic configuration of a data processing unit according to an exemplary embodiment of the present invention. As illustrated in FIG. 1, the data processing unit includes data input/output units 101-1 to 101-$n$, communication units 102-1 to 102-$n$+m, and processing units 103-1 to 103-$m$.

Each of the communication units 102-1 to 102-$n$+m is connected to the communication units adjacent thereto via a bus (note that the communication unit 102-$n$+m is connected to the communication unit 102-1), thereby forming a ring bus. More specifically, the communication units 102-1 to 102-$n$+m are connected in the form of a ring to form the ring bus, and the communication units 102-1 to 102-$n$+m transmit and receive data to and from the data input/output units 101-1 to 101-$n$ or the processing units 103-1 to 103-$m$ via the ring bus. The communication units 102-1 to 102-$n$ are connected to the data input/output units 101-1 to 101-$n$, respectively. The communication units 102-$n$+1 to 102-$n$+m are connected to the processing units 103-1 to 103-$m$, respectively.

The communication unit 102-1 receives data input from an input terminal 151-1 via the data input/output unit 101-1. The communication unit 102-1 packetizes the input data and causes the obtained packet to flow through the ring bus. The communication unit 102 captures a packet determined to be necessary based on preset information via the ring bus, extracts the data from the captured packet, and transmits the data to one of the processing units 103. The processing unit 103 executes predetermined data processing which is assigned in advance (such as color space conversion and resolution conversion) and returns the processed data to the communication unit 102. The communication unit 102 packetizes the processed data and causes the packet to flow through the ring bus. In this way, the communication units 102-1 to 102-$n$+m execute data control, so that the processing units 103-1 to 103-$m$ process the data input from the data input/output units 101 to 101-$n$ in a predetermined order.

Next, after a series of data processes is completed, any one of the communication unit 102-1 to 102-$n$ captures the processed data and transmits the data to the corresponding input/output units 101. The input/output unit 101 then outputs the data via the output terminal 152. The data input/output units 101 to 101-$n$ are used as interfaces for external devices (or modules), and thus, if the communication units 102-1 to 102-$n$ can directly be used as interfaces, the data input/output units 101-1 to 101-$n$ may be omitted.

Figure 2:
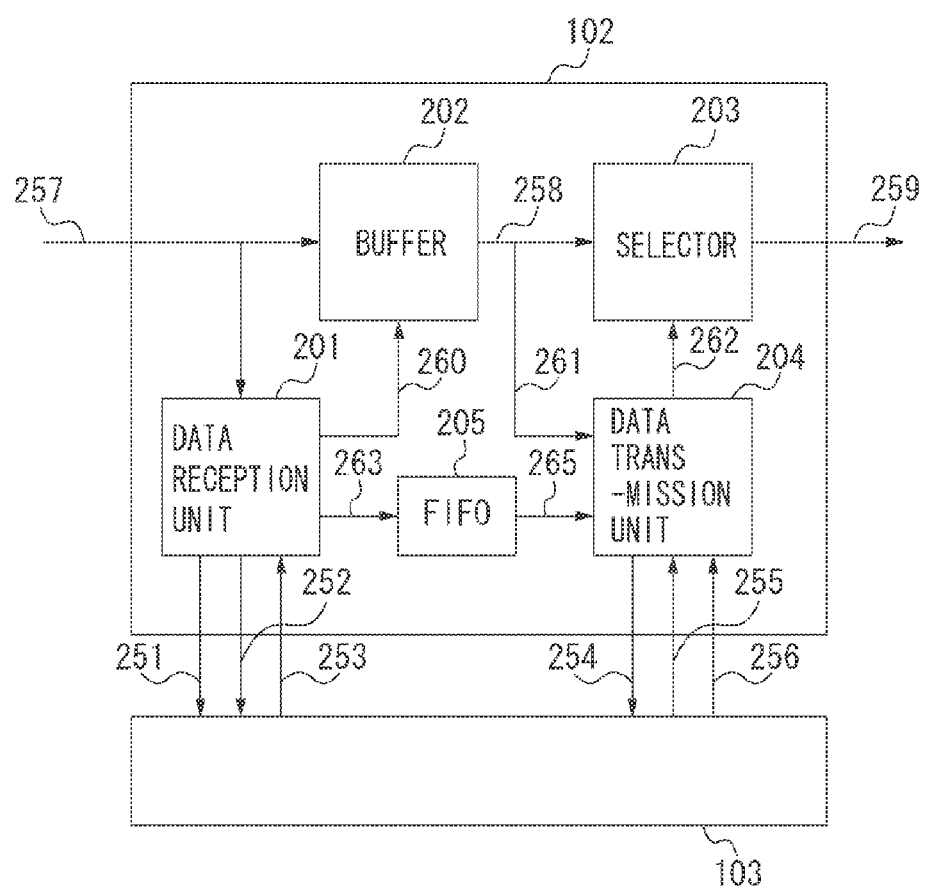
FIG. 2 is a block diagram illustrating a schematic configuration of a communication unit.

FIG. 2 is a block diagram illustrating a schematic configuration of the communication unit 102. As illustrated in FIG. 2, the communication unit 102 includes a data reception unit 201, a buffer 202, a selector 203, a data transmission unit 204, and a first-in first-out (FIFO) unit 205.

An input terminal 257 of the communication unit 102 is connected to an output terminal 259 of an adjacent communication unit 102, and in this way, the communication units 102-1 to 102-$n$+m form a ring bus. In FIG. 2, signal lines 251, 252, 253, 254, 255, and 256 of the communication unit 102 are connected to one of the processing units 103-1 to 103-$m$ that corresponds thereto. Further, hereinafter, for simplicity, a signal supplied via the signal line 253 is referred to as a signal 253 as needed.

FIG. 4A illustrates a configuration example of a packet flowing through the ring bus. A field 501 stores a valid flag indicating whether the packet is valid or not (1=valid and 0=invalid). A field 502 stores a stall flag indicating whether reception of the packet is suspended (1: suspended and 0: not suspended). A field 503 stores a count value indicating the order of data transmission (the order of processing), a field 504 stores a connection identification (ID) for identifying logical data connection, and a field 506 stores data input to or output from the communication unit 102.

The buffer 202 temporarily stores the packet input from the adjacent communication unit 102 via the input terminal 257 and outputs the packet to the selector 203 at a next clock cycle.

The data reception unit 201 monitors the packet supplied via the input terminal 257. If the valid flag of the packet indicates valid and the connection ID and the count value of the packet match the values stored in the communication unit 102, the data reception unit 201 determines whether data can be captured from the packet.

More specifically, the data reception unit 201 determines that the data can be captured from the packet when the processing unit 103 connected thereto can capture the data, (when the stall signal 253 is not suspended). In this case, the data reception unit 201 captures the packet, validates the valid signal 251, and outputs the data to the processing unit 103 via the signal line 252. The data reception unit 201 notifies the buffer 202 of the capture of the data via the signal line 260, clears the valid flag of the packet stored in the buffer 202, and invalidates the packet from which the data has been extracted. Further, after the data reception unit 201 captures the packet, the data reception unit 201 increments the count value.

On the other hand, the data reception unit 201 determines that data cannot be captured from the packet, when the data reception unit 201 determines that the processing unit 103 connected thereto cannot receive data (when the stall signal 253 is suspended). In this case, the data reception unit 201 notifies the buffer 202 of the suspension of data via the signal line 260 and sets a stall flag in the packet stored in the buffer 202. The processing unit 103 cannot receive data in various situations including when the processing unit 103 is in processing.

Even when the valid flag of the input packet indicates valid and the connection IDs match, if the count values do not match, since the data capture orders do not match, the data reception unit 201 sets the stall flag.

Next, if the connected processing unit 103 can output data (if the valid signal 256 is valid), the data transmission unit 204 attempts to store the data processed by the processing unit 103 in the packet.

The data transmission unit 204 monitors the valid flag of the packet output from the buffer 202 via the signal line 258. If the valid flag indicates valid, the data transmission unit 204 determines that the data cannot be output to the ring bus. As a result, the data transmission unit 204 asserts the stall signal 254 to suspend the output of data from the corresponding processing unit 103 to the communication unit 102.

On the other hand, if the valid flag indicates invalid, the data transmission unit 204 determines that the data can be output to the ring bus. In this case, the data transmission unit 204 negates the stall signal 254 and acquires the processed data from the processing unit 103. Further, the data transmission unit 204 changes the valid flag of the packet from invalid to valid and invalidates the stall flag. The data transmission unit 204 adds the count value and the connection ID (second ID) stored therein to the data acquired from the processing unit 103, as the count value and the connection ID of the packet. Next, the data transmission unit 204 controls the selector 203 to output the packet to the ring bus via the output terminal 259, and after the packet is output, the data transmission unit 204 increments the count value.

Figure 3A:
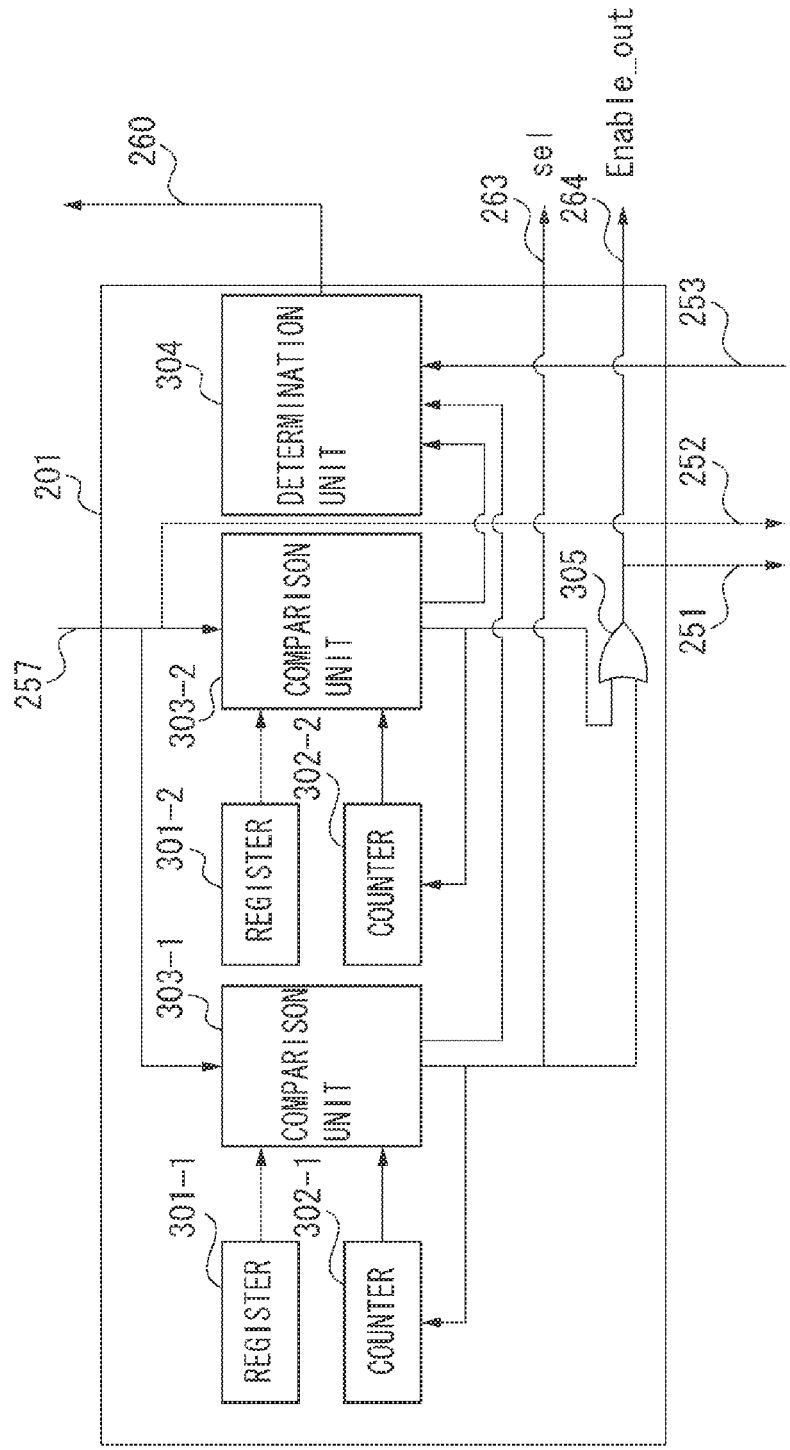
FIGS. 3A and 3B are block diagrams illustrating schematic configurations of a data reception unit and a data transmission unit, respectively.

FIG. 3A is a block diagram illustrating a schematic configuration of the data reception unit 201. As illustrated in FIG. 3A, the data reception unit 201 includes registers 301-1 and 301-2, counters 302-1 and 302-2, comparison units 303-1 and 303-2, a determination unit 304, and an OR circuit 305.

Processing executed by the data reception unit 201 will be described in detail with reference to FIG. 3A.

The comparison unit 303 monitors the valid flag, the connection ID, and the count value of the packet, on the ring bus, input via the input terminal 257. When the valid flag of the packet indicates valid, the connection ID of the packet matches a connection ID stored in the register 301, and the count value of the packet corresponds to a value of the counter 302, the data reception unit 201 validates the valid signal 251. When the valid signal 251 is validated, the data reception unit 201 outputs the data of the monitored packet to the processing unit 103 to the signal line 252. When the data is output, the comparison unit 303 inputs a packet determination signal and a count match signal to the determination unit 304. The packet determination signal indicates that the valid flag of the input packet indicates valid and the connection ID of the packet matches the ID (first ID) stored in the register 301). The count match signal indicates that the count value of the input packet matches a value of the counter 302.

Based on the packet determination signal, the count match signal, and the stall signal 253 from the corresponding processing unit 103, the determination unit 304 determines whether the processing unit 103 has captured data. If the determination unit 304 determines that the processing unit 103 has captured data, the determination unit 304 notifies the buffer 202 of the capture of the data via the signal line 260, clears the valid flag of the packet stored in the buffer 202, and invalidates the packet. While described in detail below, on/off of the packet invalidation processing can be switched by a central processing unit (CPU) 801 or the like (a control unit to be described below outside the data processing unit), according to data branches (use of a plurality of processing units).

As illustrated in FIG. 3A, in the present exemplary embodiment, there are two sets of the register 301, the counter 302, and the comparison unit are provided and each set is distinguished by a hyphenated number (-1, -2) after the reference numeral. Based on this configuration, two sets of connection IDs and count values can be compared simultaneously. The above operation is performed when one of the packets matches so that the OR circuit 305 calculates a logical sum and outputs a result as the valid signal 251 to the processing unit 103. Further, since the data transmission unit 204 adds the connection ID and the count value to an output packet, the comparison unit 303 outputs a signal 263 indicating a connection ID and count value which are matched in the two sets of comparison (comparison results obtained by the comparison unit 303-1 are used in the present exemplary embodiment) to the FIFO unit 205 (FIG. 2). While two sets of packets are compared in the present exemplary embodiment, the number of comparisons may be increased (2 to n) by increasing the number of sets of the register, the counter, and the comparison unit. In this way, 2 to n paths can be integrated.

A data capture notification signal is input to the counter 302, and if the determination unit 304 determines that the processing unit 103 has captured the data, to acquire the next data, the count value of the counter 302 is incremented (+1) at the next clock cycle.

When the determination unit 304 detects the packet determination signal, the count match signal, and the stall signal 253 from the connected processing unit 103, the determination unit 304 determines that the data that needs to be captured cannot be captured. Thus, the determination unit 304 notifies the buffer 202 of suspension of the data via the signal line 260 and sets the stall flag in the packet to be stored in the buffer 202. Further, when the determination unit 304 detects the packet determination signal but not the count match signal, the determination unit 304 determines that the data capture order does not match, while the packet is a target packet to be captured. Thus, the determination unit 304 notifies the buffer 202 of the suspension of the data via the signal line 260 and sets the stall flag in the packet to be stored in the buffer 202.

Figure 3B:
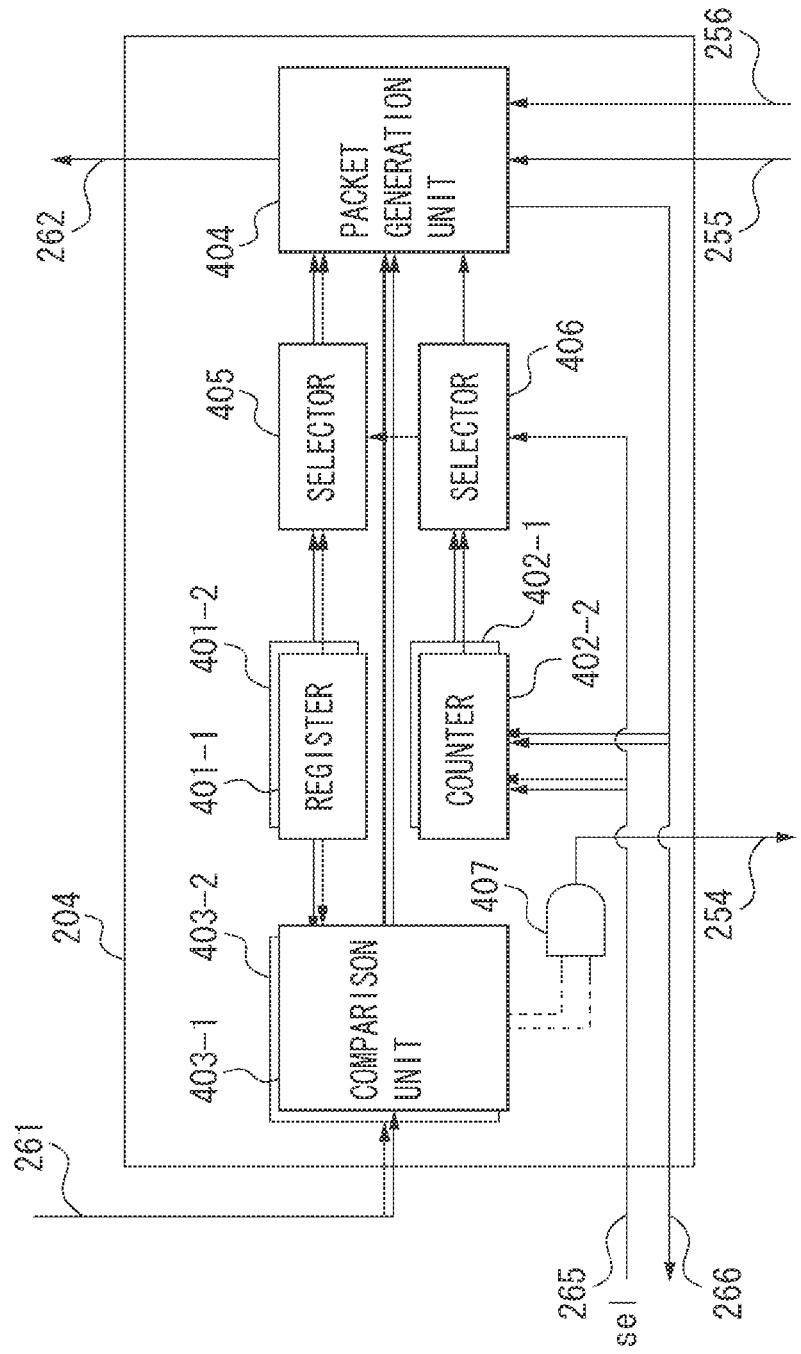

FIG. 3B is a block diagram illustrating a schematic configuration of the data transmission unit 204. As illustrated in FIG. 3B, the data transmission unit 204 includes registers 401-1 and 401-2, counters 402-1 and 402-2, comparison units 403-1 and 403-2, a packet generation unit 404, selectors 405 and 406, and an AND circuit 407.

The comparison unit 403 performs processing based on the valid flag, the stall flag, and the connection ID of the output packet from the buffer 202 (the signal line 258 in FIG. 2) supplied through the signal line 261. First, when the valid flag indicates valid, since the data transmission unit 204 cannot output the data to the ring bus, the comparison unit 403 asserts the stall signal 254 via the AND circuit 407 to suspend the output of the data from the connected processing unit 103. On the other hand, if the valid flag indicates invalid, the comparison unit 403 negates the stall signal 254 via the AND circuit 407.

When the valid flag and the stall flag of the packet in the buffer 202 indicate valid and invalid, respectively, the comparison unit 403 determines whether the connection ID of the packet output from the buffer 202 matches the connection ID of the register 401-1 or 401-2. If the connection IDs match, it means that the packet including the second ID has been returned without being suspended and that there is no module to process the packet. Thus, since there is no need to transmit the packet to the ring bus again, the comparison unit 403 controls the selector 203 via the packet generation unit 404 to invalidate the valid flag, thereby invalidating the packet. In this case as well, since the packet can be output, the comparison unit 403 negates the stall signal 254 via the AND circuit 407.

The packet generation unit 404 refers to the valid signal 256 from the processing unit 103 connected thereto. First, when the valid signal 256 is valid, the packet generation unit 404 determines that the processing unit 103 can output data.

Next, the packet generation unit 404 determines whether the packet output from the buffer 202 can store the data. More specifically, when the valid flag indicates invalid or when the packet is to be invalidated, the packet generation unit 404 determines that the packet can store the data. The packet to be invalidated is a packet whose valid flag indicates valid, stall flag indicates not suspended, and connection ID matches the connection ID stored in the register 401.

When the packet generation unit 404 stores the data from the processing unit 103 in the packet in the buffer 202, the packet generation unit 404 validates the valid flag, invalidates the stall flag, and adds the count value of the counter 402 and the connection ID set in the register 401. The data transmission unit 204 controls the selector 203 to output the packet to the ring bus via the output terminal 259, and the count value of the counter 402 is incremented (+1) at the next clock cycle.

Since the counter 402 of the data transmission unit 204 and the counter 302 (first counter) of the data reception unit 201 which receives the packet from the data transmission unit 204 are synchronized, the counters are initialized to have the same value when the data processing unit starts processing.

Further, as illustrated in FIG. 3B, the data transmission unit 204 of the present exemplary embodiment includes two sets of the register 401 and the counter 402 (second counter) and each set is distinguished by a number (-1, -2) attached to the reference numeral thereof. Based on this configuration, packets of two paths can be output simultaneously, and thus, data control operations such as a data branch from a path 1 to a path 2 and a time-division multiplexing process are possible. The selector 405 selects the register 401-1 or 401-2 and the selector 406 selects the counter 402-1 or 402-2, based on a select signal 265 output from the FIFO unit 205. A combination of the register 401 and the counter 402 corresponds to a combination of the register 301 and the counter 302 of the data reception unit 201. Thus, the number (2 to n) of sets of the registers and the counters of the data transmission unit 204 may be increased to correspond to the data reception unit 201.

Since each of the data input/output units 101-1 to 101-$n$ handles a single input/output data stream, the number of the registers 301, the counters 302, the comparison units 303, the registers 401, and the counters 402 included in each of the communication units 102-1 to 102-$n$ can be one. Thus, the FIFO unit 205 is not necessary in this case.

As described above, each of a plurality of processing modules transfers a packet in one direction, and as a result, packets circulate in one direction through the ring. By setting connection IDs based on the pipeline processing, when a packet reaches a processing module in which the packet to be processed, the processing unit connected to the processing module can capture and process the data of the packet. The processing unit adds a connection ID to the processed data, so that the next processing module can capture the data, and outputs the data to the ring bus. By repeating this processing, a plurality of processing modules sequentially executes a series of data processing (pipeline processing, for example).

Next, the operation of the data flow processing will be described with reference to signal flow graphs illustrated in FIGS. 6A and 6B. In these signal flow graphs, circles represent nodes and arrows represent processing. For simplicity of description, as illustrated in FIG. 5, the data processing unit including two data input/output units and four processing units is used and an operation of simultaneously processing two data flows will be hereinafter described.

Figure 6A:
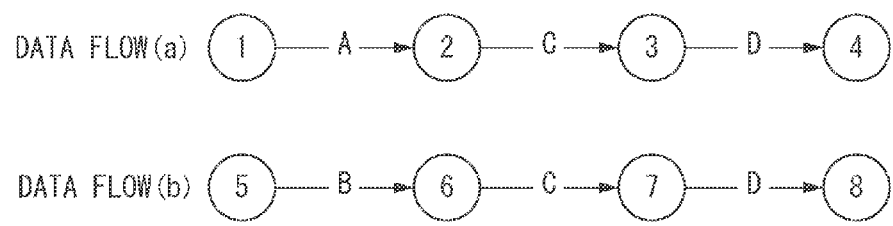
FIGS. 6A and 6B illustrate examples of signal flows in the case of simultaneous processing.
Figure 6B:
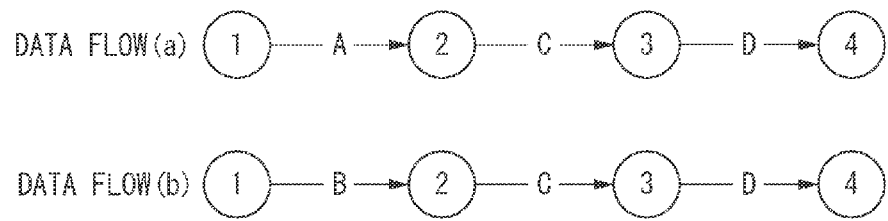

FIGS. 6A and 6B illustrate signal flows in the case of data flows 1 and 2, respectively. The data processing unit illustrated in FIG. 5 can process the data flows 1 and 2 based on time-division multiplexing (time sharing). First, to form a data flow (a), a value "1" is stored in the register 301-1 of the data reception unit 201 of the communication unit 102-3 connected to a processing unit A (processing unit 103-1) and a value "2" is stored in the register 401-1 of the data transmission unit of the communication unit 102-3. Similarly, values "2" and "3" are stored in the register 301-1 and the register 401-1 of a processing unit C (processing unit 103-3), respectively. Further, values "3" and "4" are stored in the register 301-1 and the register 401-1 of a processing unit D (processing unit 103-4), respectively. Since the input terminal 151-1 corresponds to a node 1 and the output terminal 152-1 corresponds to a node 4, a value "4" is stored in the register of the data reception unit and a value "1" is stored in the register of the data transmission unit of the communication unit 102-1.

Further, to form a data flow (b), a value "5" is stored in the register 301-2 of the data reception unit and a value "6" is stored in the register 401-2 of the data transmission unit in the communication unit 102-4 of a processing unit B (processing unit 103-2), respectively. Simply put, values "6" and "7" are stored in the registers 301-2 and 401-2 connected to the processing unit C, and values "7" and "8" are stored in the registers 301-2 and 401-2 connected to the processing unit D. Since the input terminal 151-2 corresponds to a node 5 and the output terminal 152-2 corresponds to a node 8, values "8" and "5" are stored in the register of the data reception unit and the register of the data transmission unit of the communication unit 102-2, respectively.

While the data flow processing will be hereinafter described for each of the data flows in FIGS. 6A and 6B, the description will be made based on the assumption that no suspension of input data is generated in the processing units 103 and the input/output units 101 for simplicity of the description. Based on this condition, the stall flag and the count value of the packet are unnecessary. Normally, input data can be suspended. Thus, when the communication unit 102 receives and outputs data, the corresponding counter is incremented, and when the value of the counter and the connection ID of the received packet match those stored in the communication unit 102, the communication unit 102 captures the packet. Further, an unused register of the data reception unit in the communication unit 102 is set to have a value which is not used in the corresponding signal flow graph, so that the packet is not captured by the unused register (normally, the value is initialized to be "0", so that the connection ID including a value "0" is not used in the signal flow graph).

First, the data flow processing will be described based on the data flow (a). First, the communication unit 102-1 receives data via the input terminal 151-1, adds the value "1" stored in the register of the data transmission unit as the connection ID, and outputs the data to the adjacent communication unit 102-2. Since the communication unit 102-2 awaits a connection ID including a value "8", the packet with the connection ID including the value "1" is output as it is to the communication unit 102-3. Next, since the communication unit 102-3 awaits a connection ID including the value "1", the communication unit 102-3 captures the packet and the processing unit 103-1 performs processing A. The communication unit 102-3 adds a value "2" stored in the register of the data transmission unit of the communication unit 102-3 to the data processed by the processing unit 103-1 as a connection ID. Next, the communication unit 102-3 outputs the data to the adjacent communication unit 102-4.

Since the communication unit 102-4 awaits a connection ID including a value "5", the communication unit 102-4 outputs the packet with the connection ID including the value "2" as it is to the communication unit 102-5. Since the communication unit 102-5 awaits a connection ID including the value "2", the communication unit 102-5 captures the packet and the processing unit 103-3 performs processing C. Next, the communication unit 102-5 adds a value "3" stored in the register of the data transmission unit of the communication unit 102-5 to the data processed by the processing unit 103-3 as a connection ID. Next, the communication unit 102-5 outputs the data to the adjacent communication unit 102-6. Since the communication unit 102-6 awaits a connection ID including a value "3", the communication unit 102-6 captures the packet and the processing unit 103-4 performs processing D. The communication unit 102-6 adds a value 4 stored in the register of the data transmission unit of the communication unit 102-6 to the data processed by the processing unit 103-4 as a connection ID. Next, the communication unit 102-6 outputs the data to the adjacent communication unit 102-1. Since the communication unit 102-1 awaits a connection ID including the value "4", the communication unit 102-1 captures the packet and outputs the data via the output terminal 152-1.

Next, the data flow processing will be described based on the data flow (b). First, the communication unit 102-2 receives data via the input terminal 151-2, adds the value "5" stored in the register of the data transmission unit as the connection ID, and outputs the data to the adjacent communication unit 102-3. Since the communication unit 102-3 awaits a connection ID including the value "1", the packet with the connection ID including the value "5" is output as it is to the communication unit 102-4. Since the communication unit 102-4 awaits a connection ID including the value "5", the communication unit 102-4 captures the packet and the processing unit 103-2 performs processing B. The communication unit 102-4 adds a value "6" stored in the register of the data transmission unit of the communication unit 102-4 to the data processed by the processing unit 103-2 as a connection ID. Next, the communication unit 102-4 outputs the data to the adjacent communication unit 102-5. Since the communication unit 102-5 awaits a connection ID including the value "6", the communication unit 102-5 captures the packet and the processing unit 103-3 performs processing C.

The communication unit 102-5 adds a value "7" stored in the register of the data transmission unit of the communication unit 102-5 to the data processed by the processing unit 103-3 as a connection ID. Next, the communication unit 102-5 outputs the data to the adjacent communication unit 102-6. Since the communication unit 102-6 awaits a connection ID including the value "7", the communication unit 102-6 captures the packet and the processing unit 103-4 performs processing D. Next, the communication unit 102-6 adds a value "8" stored in the register of the data transmission unit of the communication unit 102-6 to the data processed by the processing unit 103-4 as a connection ID. Next, the communication unit 102-6 outputs the data to the adjacent communication unit 102-1. Since the communication unit 102-1 awaits a connection ID including a value "4", the communication unit 102-1 outputs the packet with the connection ID including the value "8" as it is to the communication unit 102-2. Since the communication unit 102-2 awaits a connection ID including the value "8", the communication unit 102-2 captures the packet and outputs the data via the output terminal 152-2.

The processing units C (103-3) and D (103-4) are used in the two data flows. Thus, each of the communication units 102-5 and 102-6 connected to the above processing units C and D await two connection IDs. In this case, the data captured by the connection ID of the data flow (a) needs to be added the connection ID of the data flow (a). Likewise, the data captured by the connection ID of the data flow (b) needs to be added the connection ID of the data flow (b). Thus, a signal for identifying the data flow indicated by the connection ID of the captured packet is stored in the FIFO unit 205 of FIG. 2. When the data is output, the data transmission unit 204 extracts the data flow identification signal from the FIFO unit 205. Based on this identification signal, the data transmission unit 204 selects the connection ID and the count value to be added to the data.

Based on the above operation, even when pieces of data are asynchronously input via the input terminals 151-1 and 151-2, if the connection ID of each data flow is not overlapped with each other, a plurality of data flows can be processed simultaneously.

For example, when the processing unit 103 is assigned processing in which the number of data inputs/outputs is changed, such as image enlargement/reduction processing, the processing unit 103 cannot select the connection ID and the count value only with the above FIFO unit 205. In this case, the processing unit 103 may receive the data flow identification signal and outputs data in synchronization with the data flow identification signal, so that the connection ID and the count value can be selected and added to the data. If the processing unit 103 outputs the data flow identification signal in synchronization with the data, the FIFO unit 205 is unnecessary.

Two different data flows may be executed by identifying the type of data flow. FIG. 4B illustrates a packet format including a flow ID 505 for identifying the type of data flow. Other contents of the packet format are the same as those in FIG. 4A, and the descriptions thereof will be omitted.

FIG. 6B illustrates an example of a signal flow graph including a data flow (a) and a data flow (b) when the above flow ID 505 is added to each packet. Since the data flows (a) and (b) can be identified by the flow ID, the data flows (a) and (b) can share the same connection ID. More specifically, each of the registers 301-1, 301-2, 401-1, and 401-2 may store the connection ID and the flow ID together, and the comparison unit 303 may compare the stored connection ID and flow ID with those of the input packet.

Alternatively, data input via the input terminals 151-1 and 151-2 may be supplied with the flow IDs including values "0" and "1", respectively. In this case, the register 301-1 and the counter 302-1 of the data reception unit in the communication unit 102 are used for comparison with the flow ID including the value "0". Further, the register 301-2 and the counter 302-2 of the data reception unit in the communication unit 102 are used for comparison with the flow ID including the value "1". The register 401-1 and the counter 402-1 of the data transmission unit in the communication unit 102 are used to output the data with the flow ID including the value "0". Further, the register 401-2 and the counter 402-2 of the data transmission unit in the communication unit 102 are used to output the data with the flow ID including the value Based on the above configurations, each data flow can be managed independently, so that the data flows can be configured easily. The latter can be configured with a rather simpler circuit.

Figure 7:
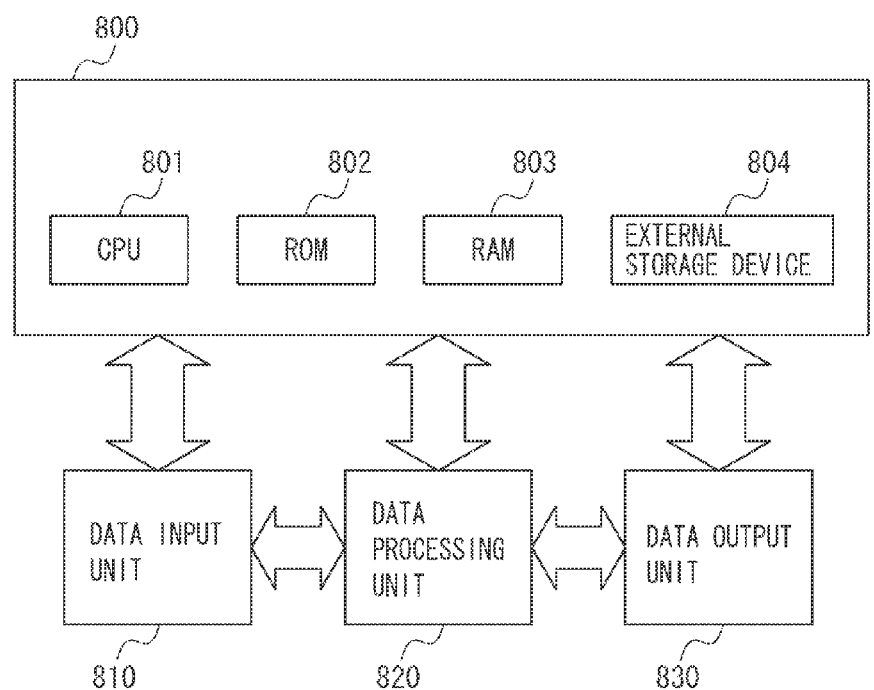
FIG. 7 is a block diagram illustrating an example of a system configuration of a data processing apparatus.

FIG. 7 illustrates a schematic configuration of a data processing apparatus which includes a data processing unit 820 as configured above.

A system control unit 800 includes a CPU 801 configured to execute calculation and control, a read-only memory (ROM) 802 configured to store fixed data and programs, a random access memory (RAM) 803 configured to temporarily store data and load programs, and an external storage device 804 configured to store external data. A data input unit 810 captures data to be processed from the outside of the system. For example, the data input unit 810 may be an image reading apparatus including a device such as an image scanner and an analog-to-digital converter or an audio input apparatus including a device such as a microphone and an analog-to-digital converter. A data output unit 830 outputs data processed by the system to the outside. For example, the data output unit 830 may be an image output apparatus including a printer device configured to convert image data into a printing dot pattern and output the converted data or an audio output apparatus configured to output audio data via a digital-to-analog converter or the like.

Data input to the data input unit 810 may be transmitted to the system control unit 800 and processed by the CPU 801. Alternatively, the data may be directly supplied to and temporarily stored in the RAM 803 or the external storage device 804. The data processing unit 820 may directly receive the input data from the data input unit 810 to process the data. Alternatively, the data processing unit 820 may receive an instruction and the data from the system control unit 800 to process the data.

Output data from the data processing unit 820 may be returned to the system control unit 800 or may be directly transmitted to the data output unit 830.

The data processing unit 820 is set to execute desired data processing under control of the system control unit 800. The data processing unit 820 receives various pieces of data to be processed, performs processing based on the setting, and outputs the processed data to the outside.

Figure 8:
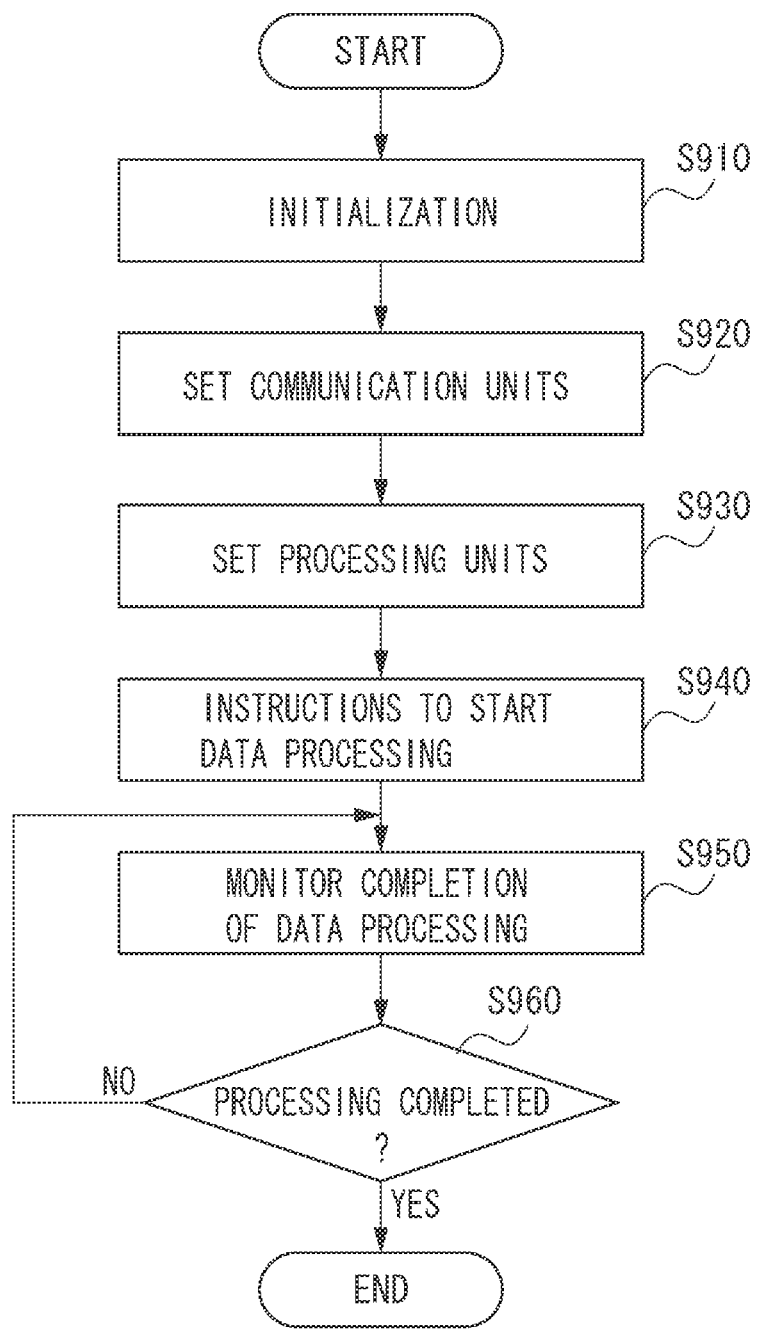
FIG. 8 is a flow chart illustrating a control procedure of the data processing unit.

FIG. 8 is a flow chart illustrating how the system control unit 800 sets the data processing unit.

First, in step S910, the system control unit 800 resets the data processing unit. In step S910, the system control unit 800 initializes the buffer 202, the register 301 in which the connection ID is set, the register 401, the counters 302 and 402 that indicate the order of data processing, a packet invalidation set register (not illustrated), and the like.

Next, in step S920, to cause the data processing unit to execute a data flow assigned thereto, the system control unit 800 sets the registers 301 and 401 of the communication unit to store the connection IDs therein. Additionally, the system control unit 800 sets initial values to the counters 302 and 402 that indicate the order of data processing and sets the packet invalidation set register and the like. These processes correspond to those described above with reference to FIGS. 6A and 6B.

Next, in step S930, the system control unit 800 designates parameters of each processing unit based on the processing assigned thereto. In step S940, an instruction to activate the data processing unit is given. In step S950, a notification of completion of processing from the data processing unit is monitored until completion of the data processing is detected in step S960. In step S960, if the notification of completion of processing from the data processing unit is detected (YEA in step S960), the processing is ended.

As described above, based on the data processing apparatus of the present exemplary embodiment, a plurality of types of pipeline processing (data flows) can be simultaneously executed by processing modules each having a different function with a simple configuration. Thus, a complex data flow which includes branches or integration can be realized easily. When a hardware module (a module whose configuration is changed by a program, and a module has little degree of freedom, for example) is used for each of the processing modules, by setting each module based on the data flow, the overall system can realize flexible processing. Further, since deletion of a packet can be controlled by each module, efficiency in the use of the ring bus is high.

In the above description, the buffer 202 is arranged between the data reception unit 201 and the data transmission unit 204 in the communication unit 102. However, the buffer 202 may be arranged in a stage subsequent to the selector 203. In this case, the selector 203 sets the stall flag used to suspend a packet and clears the valid flag used to invalidate a received packet. In addition, the present invention may be configured so that the data reception unit 201 monitors a packet from the buffer 202.

Additionally, examples of the data flow described in the above exemplary embodiment include hardware processing in which a series of processing, such as pipeline processing, is divided based on a function of the hardware. The present invention is particularly advantageous when it is applied to such processing.

Next, a second exemplary embodiment will be described. In the present exemplary embodiment, a plurality of processing units shares a single communication unit. Components and processes which include functions identical to those in the first exemplary embodiment are denoted by the same reference characters, and the descriptions thereof will be omitted.

Figure 9:
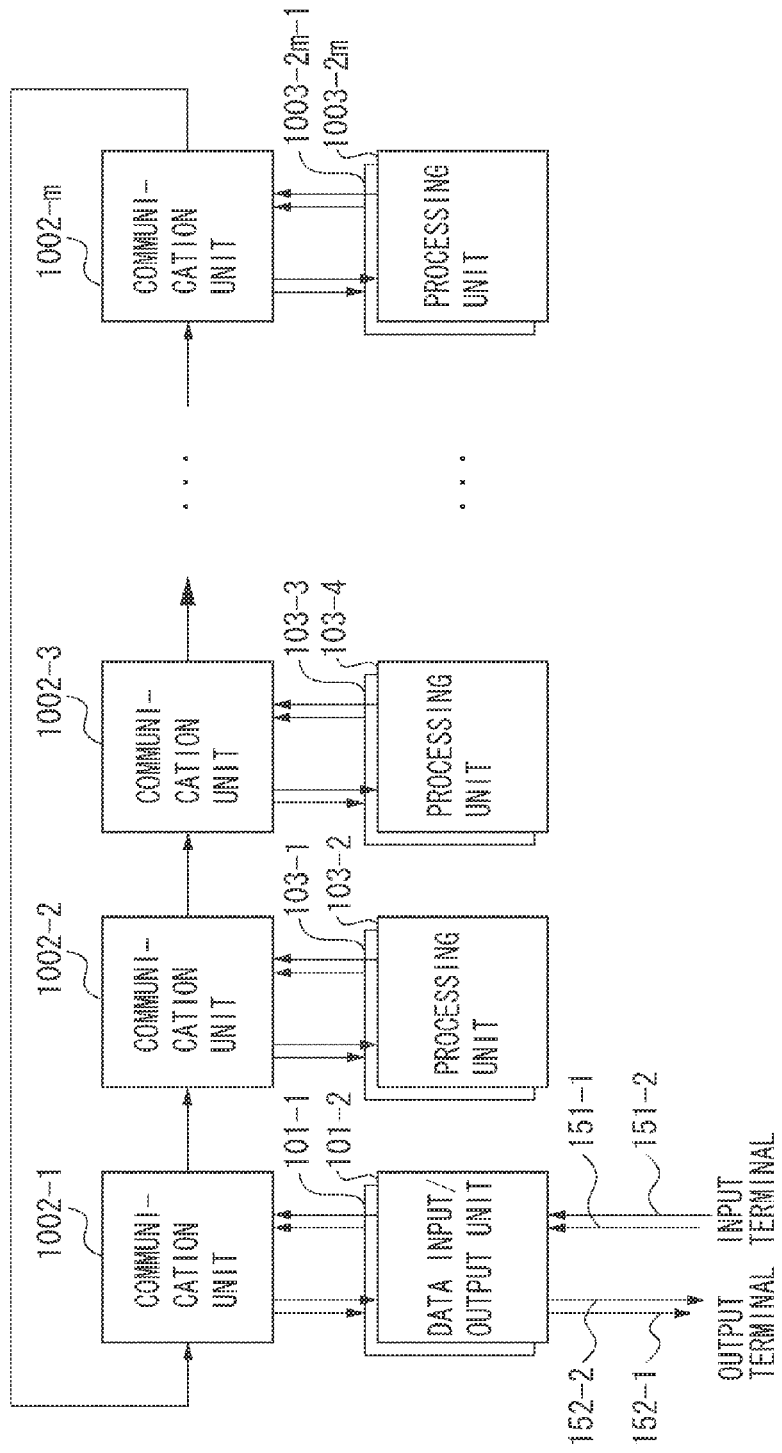
FIG. 9 is a block diagram illustrating an example of schematic configuration of the data processing unit.

FIG. 9 is a block diagram illustrating a schematic configuration of the data processing unit according to the present exemplary embodiment. As illustrated in FIG. 9, the data processing unit includes data input/output units 101-1 and 101-2, communication units 1002-1 to 1002-m, and processing units 103-1 to 103-2m.

Figure 10:
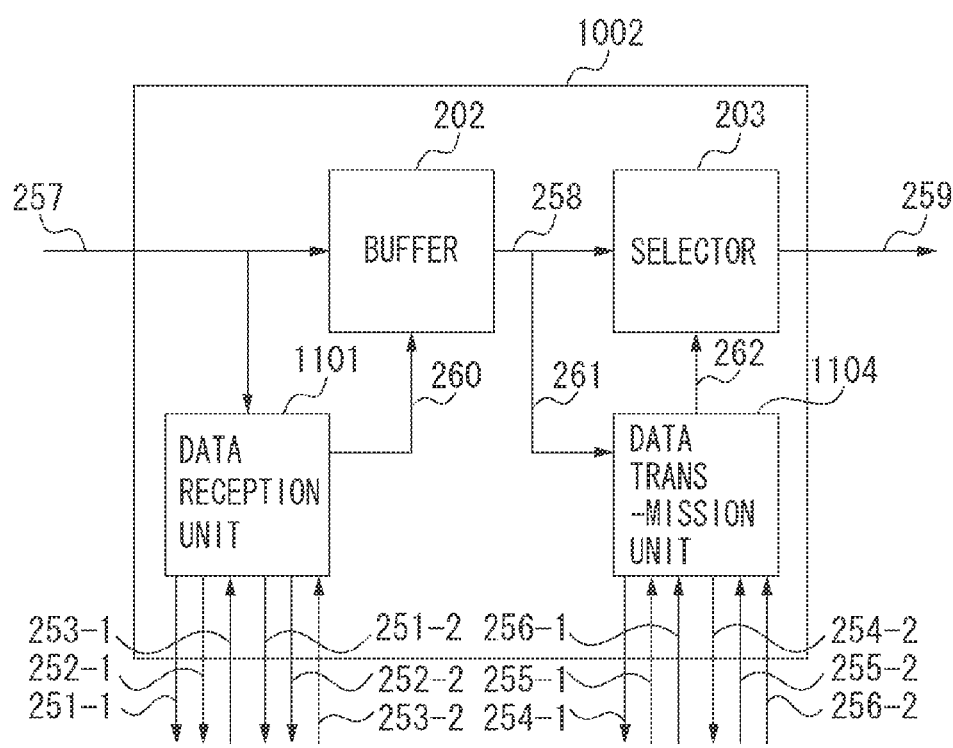
FIG. 10 is a block diagram illustrating a schematic configuration of the communication unit.

FIG. 10 is a block diagram illustrating a schematic configuration of the communication unit 1002. As illustrated in FIG. 10, the communication unit 1002 is connected to a plurality of the processing units 1003-1.

Figure 11B:
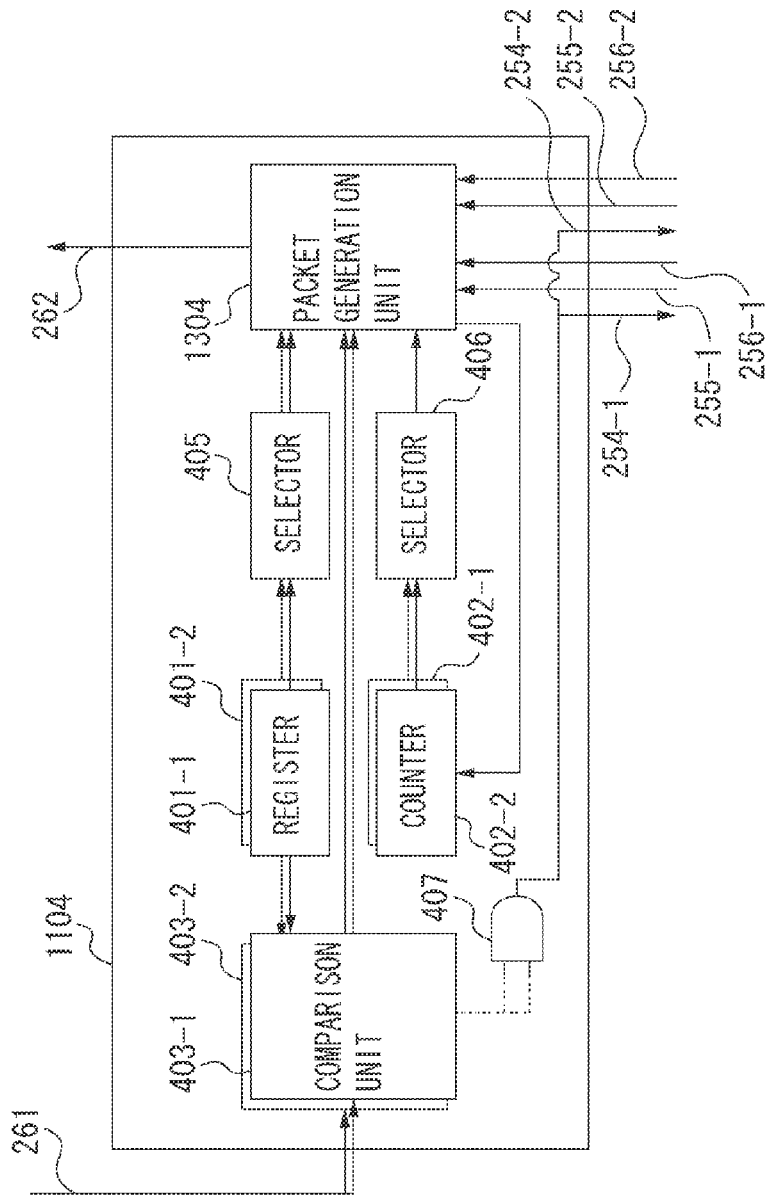

FIG. 11A is a block diagram illustrating a schematic configuration of a data reception unit 1101. In FIGS. 10, 11A and 11B, a hyphenated number (-1, -2) after the reference numeral indicates a correspondence to a connected processing unit 103. For example, ports 251-1, 252-1, 253-1, 254-1, 255-1, and 256-1 of the data reception unit 1101 are connected to respective ports of the processing unit 103-1. Ports 251-2, 252-2, 253-2, 254-2, 255-2, and 256-2 of the data reception unit 1101 are connected to respective ports of the processing unit 103-2.

A determination unit 1204 determines whether the corresponding processing unit 103 has captured data, based on the packet determination signal and the count match signal from the comparison unit 303 and the stall signal 253 from the processing unit 103. If the determination unit 1204 determines that the processing unit 103 has captured data, the determination unit 1204 notifies the buffer 202 of the capture of the data via the signal line 260, clears the valid flag of the packet stored in the buffer 202, and invalidates the packet. This operation is executed in each of the plurality of processing units 103.

For example, it is assumed that the registers 301-1 and 301-2 store the same connection ID and values of the counters 302-1 and 302-2 match with each other. In this case, when the data reception unit 1101 receives a valid packet to which the connection ID that the data reception unit 1101 awaits is added and the count value of the packet matches the value of the counters 302-1 and 302-2, the comparison units 303-1 and 303-2 validate both valid signals 251-1 and 251-2. Hereinafter, a case where the stall signal 253-1 of the processing unit 103 connected to the port 252-1 (processing unit 103-1 in the above example) is asserted, and the stall signal 253-2 of the processing unit 103 connected to the port 252-1 (processing unit 103-2 in the above example) is negated will be described. In this case, the processing unit 103-1 connected to the port 252-1 has received the data, and the processing unit 103-2 connected to the port 252-2 has not received the data. Further, the determination unit 1204 notifies the buffer 202 of the suspension of the data via the signal line 260 and sets the stall flag in the packet stored in the buffer 202. Since the processing unit 103-1 connected to the port 252-1 has received the data, the counter 302-1 is incremented.

On the other hand, since the processing unit 103-2 connected to the port 252-2 has not received the data, the counter 302-2 is not incremented. However, since the data is not deleted but suspended on the ring bus, when the data flows through the ring bus and returns, if the stall signal 253-1 is negated, the processing unit 103-2 can receive the data. Since the counter 302-1 has already been incremented, the counter 302-1 does not capture the same data twice.

FIG. 11B is a block diagram illustrating a schematic configuration of the data transmission unit 1104. A packet generation unit 1304 detects whether the valid signal 256 of each of the connected processing units 103 is valid to determine whether the processing unit 103 can output the data. Further, the packet generation unit 1304 determines whether data can be stored in the packet in the buffer 202.

When the processing unit 103 has the data to output and the buffer 202 can store the data in the packet stored therein, the packet generation unit 1304 validates the valid flag and invalidates the stall flag of the packet in the buffer 202. The packet generation unit 1304 adds a count value of the counter 402 and a connection ID set in the register 401 to the data output from one of the processing units 103, that is, the processing unit whose valid signal determined as valid (when a plurality of valid signals is determined as valid, one having the smallest hyphenated number after the reference numeral is used).

The selector 203 is controlled to output the generated packet to the ring bus via the output terminal 259. At a next clock cycle, the count value of the counter 402 that has output the above data is incremented. Since the counter 402 of the data transmission unit 1104 and the corresponding counter 302 of the data reception unit 1101 which receives the packet from this data transmission unit 1104 are synchronized, the counters 402 and 302 are initialized to have the same value when the data processing is started.

While FIG. 11B illustrates two sets of the register 401 and the counter 402, the number of the sets corresponds to the number of data ports of the connected processing unit 103 (the same applies to the data reception unit 1101).

As described above, based on the data processing apparatus according to the present exemplary embodiment, a plurality of processing units can share a single communication unit. Accordingly, the number of stages (the number of modules) connected in series on the ring bus can be reduced, and as a result, the circuit can be simplified. For example, by using a simple circuit configuration, it is possible to realize a data flow in which different types of processing are simultaneously executed on the same data to obtain a plurality of different results.

In the above exemplary embodiment, a value is set in each of the registers 401 of the data transmission unit in the communication unit 102. However, a fixed value maybe used for each register. In this case, while the node number after each of the arrows indicating processing in the signal flow graphs is fixed for each processing, since setting of a source of the arrow (input) can be arbitrarily changed by a program, similar operations as described above can be performed.

Further, in the above exemplary embodiment, the valid flag indicating whether the packet is valid or not is used. However, the present invention is not limited to such configuration. A certain connection ID (a third ID including a value "0", for example) may be used to indicate an invalid packet. However, the certain ID needs to be different from the connection IDs (first IDs) set in any communication units.

Further, while the above exemplary embodiment has been described using the data processing apparatus which includes the ring bus, the present invention is applicable to other configurations. More specifically, the present invention is applicable as long as each of processing modules is connected to each other in an (indirectly or directly) intercommunicable form and output from the processing module can be transmitted to all the other processing modules via broadcast communication or the like. For example, even in the case of a star topology, by enabling communication among all processing modules used for a series of processing and applying the present invention, the above effects can be obtained.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-137343 filed Jun. 8, 2009, which is hereby incorporated by reference herein in its entirety.

What is claimed is:

1. An apparatus in which a plurality of modules is connected to each other in a form of a ring, and the modules transfer packets in a predetermined direction to execute a plurality of data processing flows,
wherein at least one module in the plurality of modules comprises:
a storage unit configured to hold a plurality of sets of a reception identification and a transmission identification, the reception identification and the transmission identification set before starting the plurality of data processing flows;
a comparison unit configured to compare an identification included in a received packet and a first reception identification held in the storage unit;
a control unit configured to control extracting data from the received packet, wherein the identification included in the received packet matches with the first reception identification held in the storage unit;
a processing unit configured to process the extracted data; and
a transmission unit configured to determine a first transmission identification that corresponds to the first reception identification, and to transmit the packet to another module after replacing the identification included in the packet with a value of the first transmission identification,
wherein each of the plurality of sets of the reception identification and the transmission identification corresponds to a different one of the data processing flows.

2. The apparatus according to claim 1, wherein the modules are connected to a ring bus.

3. The apparatus according to claim 1,
wherein the storage unit is configured to have a plurality of sets of a first count value and a second count value for each of the plurality of data processing flows, the plurality of sets of a first count value and a second count value set before starting the plurality of data processing flows,
wherein the module further comprises a plurality of sets of a first counter and a second counter configured to count the first count value and the second count value that correspond to each of the plurality of data processing flows, and
wherein the control unit is configured to control receiving data in the packet which includes a count value matching the value of the first counter and which has an identification matching the first reception identification corresponding to the data processing flows.

4. The apparatus according to claim 3, wherein the first counter is configured to increment the first count value corresponding to the data processing flow when the control unit determines to extract the data from the packet, and
the second counter is configured to increment the second count value corresponding to the data processing flow when the transmission unit transmits the packet.

5. The apparatus according to claim 4,
wherein, when the transmission unit adapts the data from the processing unit, the second identification, the second count value, and a valid flag indicating that the data is valid to the packet, and
wherein the control unit determines to extract data from the packet to which the valid flag indicates the valid packet matching the first identification and the first count value of the storage unit.

6. The apparatus according to claim 1,
wherein the control unit is configured to control outputting a data processing flow identification signal for identifying the plurality of data processing flows,
wherein the module further comprises a first-in first-out (FIFO) unit configured to synchronize the data processing flow identification signal with the packet output from the processing unit, and
wherein the transmission unit is configured to select the second identification depending on the output from the FIFO unit, and to adapt the selected identification to the packet.

7. The apparatus according to claim 1, wherein, when the control unit attempts to extract data from the packet and the processing unit is not in a data receivable state, the control unit controls transferring the packet to the transmission unit without extracting the data and sets a stall flag indicating that a captured packet by the module is suspended to the packet.

8. The apparatus according to claim 7, wherein, when the control unit determines to receive a packet which includes the second identification and no stall flag is set, the transmission unit invalidates the packet.

9. The apparatus according to claim 8, wherein each module further comprises a setting unit configured to set the transmission to execute invalidation or not to execute invalidation.

10. The apparatus according to claim 1, wherein the transmission unit invalidates the packet from which data is extracted.

11. A method for processing data executed by an apparatus in which a plurality of modules is connected to each other in a form of a ring and the modules transfer packets in a predetermined direction to execute a plurality of data processing flows,
holding a plurality of sets of a reception identification and a transmission identification, the reception identification and the transmission identification set before starting the plurality of data processing flows;
comparing an identification included in a received packet and a first reception identification held in the storage unit;
extracting data from the packet, wherein the identification included in the received packet matches with the first reception identification held in the storage unit;
processing the extracted data by a processing unit;
determining a first transmission identification that corresponds to the first reception identification; and
transmitting the packet, by a transmission unit, to a module after replacing the identification included in the packet with a value of the first transmission identification,
wherein each of the plurality of sets of the reception identification and the transmission identification corresponds to a different one of the data processing flows.

12. The method according to claim 11, further comprising counting a first count value and a second count value that correspond to each of the plurality of data processing flows,
wherein the holding the reception identification and the transmission identification further comprises holding a plurality of sets of the first count value and the second count value for each of the plurality of data processing flows, the plurality of sets of a first count value and a second count value set before starting the plurality of data processing flows, and
wherein the extracting further comprises receiving data in the packet which includes a count value matching the value of the first counter and which has an identification matching the first reception identification corresponding to the data processing flows.

13. The method according to claim 11, further comprising outputting a data processing flow identification signal for identifying the plurality of data processing flows;
synchronizing the data processing flow identification signal with packet output from the processing unit; and
selecting the second identification depending on the outputting and adapting the selected identification to the packet.

14. The method according to claim 11, wherein, when the extracting attempts to extract data from the packet and the processing unit is not in a data receivable state, the extracting transfers the packet to the transmission unit without extracting the data and sets a stall flag indicating that a captured packet by the extracting is suspended to the packet.

15. The method according to claim 11, further comprising invalidating the packet from which data is extracted.

16. A non-transitory computer-readable storage medium configured to store a program controlling an apparatus in which a plurality of modules is connected to each other in a form of a ring and the modules transfer packets in a predetermined direction to execute a plurality of data processing flows,
holding a plurality of sets of a reception identification and a transmissions identification, the reception identification and the transmission identification set before starting the plurality of data processing flows;
comparing an identification included in a received packet and a first reception identification held in the storage unit;
extracting data from the packet, wherein the identification included in the received packet matches with the first reception identification held in the storage unit;
processing the extracted data;
determining a first transmission identification that corresponds to the first reception identification; and
transmitting the packet, by a transmission unit, to a module after replacing the identification included in the packet with a value of the first transmission identification,
wherein each of the plurality of sets of the reception identification and the transmission identification corresponds to a different one of the data processing flows.

17. The non-transitory computer-readable storage medium according to claim 16, further comprising counting a first count value and a second count value that correspond to each of the plurality of data processing flows,
wherein the holding the reception identification and the transmission identification further comprises holding a plurality of sets of the first count value and the second count value for each of the plurality of data processing flows, the plurality of sets of a first count value and a second count value set before starting the plurality of data processing flows, and
wherein the extracting further comprises receiving data in the packet which includes a count value matching the value of the first counter and which has an identification matching the first reception identification corresponding to the data processing flow.

18. The non-transitory computer-readable storage medium according to claim 16, further comprising:
- outputting a data processing flow identification signal for identifying the plurality of data processing flows;
- synchronizing the data processing flow identification signal with packet output from the processing unit; and
- selecting the second identification depending on the outputting and adapting the selected identification to the packet.

19. The non-transitory computer-readable storage medium according to claim 16, wherein, when the extracting attempts to extract data from the packet and the processing unit is not in a data receivable state, the extracting transfers the packet to the transmission unit without extracting the data and sets a stall flag indicating that a captured packet by the extracting is suspended to the packet.

* * * * *